US 7,997,000 B2

(12) United States Patent
Van Der Meijden et al.

(10) Patent No.: US 7,997,000 B2
(45) Date of Patent: Aug. 16, 2011

(54) ARRANGEMENT AND METHOD FOR POSITIONING THE ALIGNMENT PLUMB LINES OF THE GUIDE RAILS OF AN ELEVATOR

(75) Inventors: Gert Van Der Meijden, Otterlo (NL); Jos Van Den Heuvel, NN's-Hertogenbosch (NL)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/954,355

(22) Filed: Nov. 24, 2010

(65) Prior Publication Data
US 2011/0067252 A1 Mar. 24, 2011

Related U.S. Application Data

(63) Continuation of application No. PCT/FI2009/000058, filed on Jun. 16, 2009.

(30) Foreign Application Priority Data

Jun. 27, 2008 (FI) ...................................... 20080419

(51) Int. Cl.
*G01B 5/25* (2006.01)
(52) U.S. Cl. .......................................... 33/645; 33/404

(58) Field of Classification Search .................... 33/404, 33/613, 645
See application file for complete search history.

(56) References Cited

U.S. PATENT DOCUMENTS

| | | | | |
|---|---|---|---|---|
| 6,481,538 | B2 * | 11/2002 | Blackaby et al. | 187/408 |
| 2005/0016797 | A1 * | 1/2005 | Reynolds et al. | 187/340 |
| 2006/0243530 | A1 * | 11/2006 | Aulanko et al. | 187/260 |
| 2009/0065310 | A1 * | 3/2009 | Flynn et al. | 187/408 |
| 2010/0147632 | A1 * | 6/2010 | Tracey et al. | 187/334 |
| 2010/0252369 | A1 * | 10/2010 | Tolonen | 187/379 |
| 2010/0287876 | A1 * | 11/2010 | Van Der Meijden et al. | 187/408 |

FOREIGN PATENT DOCUMENTS

| | | |
|---|---|---|
| GB | 2 185 333 A | 7/1987 |
| JP | 6-321455 A | 11/1994 |
| JP | 8-133623 A | 5/1996 |
| WO | WO 00/47510 A1 | 8/2000 |

* cited by examiner

*Primary Examiner* — G. Bradley Bennett
(74) *Attorney, Agent, or Firm* — Birch, Stewart, Kolasch & Birch, LLP

(57) ABSTRACT

An arrangement and a method are provided for positioning the alignment plumb lines of the guide rails of an elevator, more particularly when installing an elevator during the construction phase of a building. The solution includes at least actuators fixed above the guide rails for moving at least the parts of the alignment plumb lines above the guide rails for positioning the alignment plumb lines.

20 Claims, 5 Drawing Sheets

Figure 1:
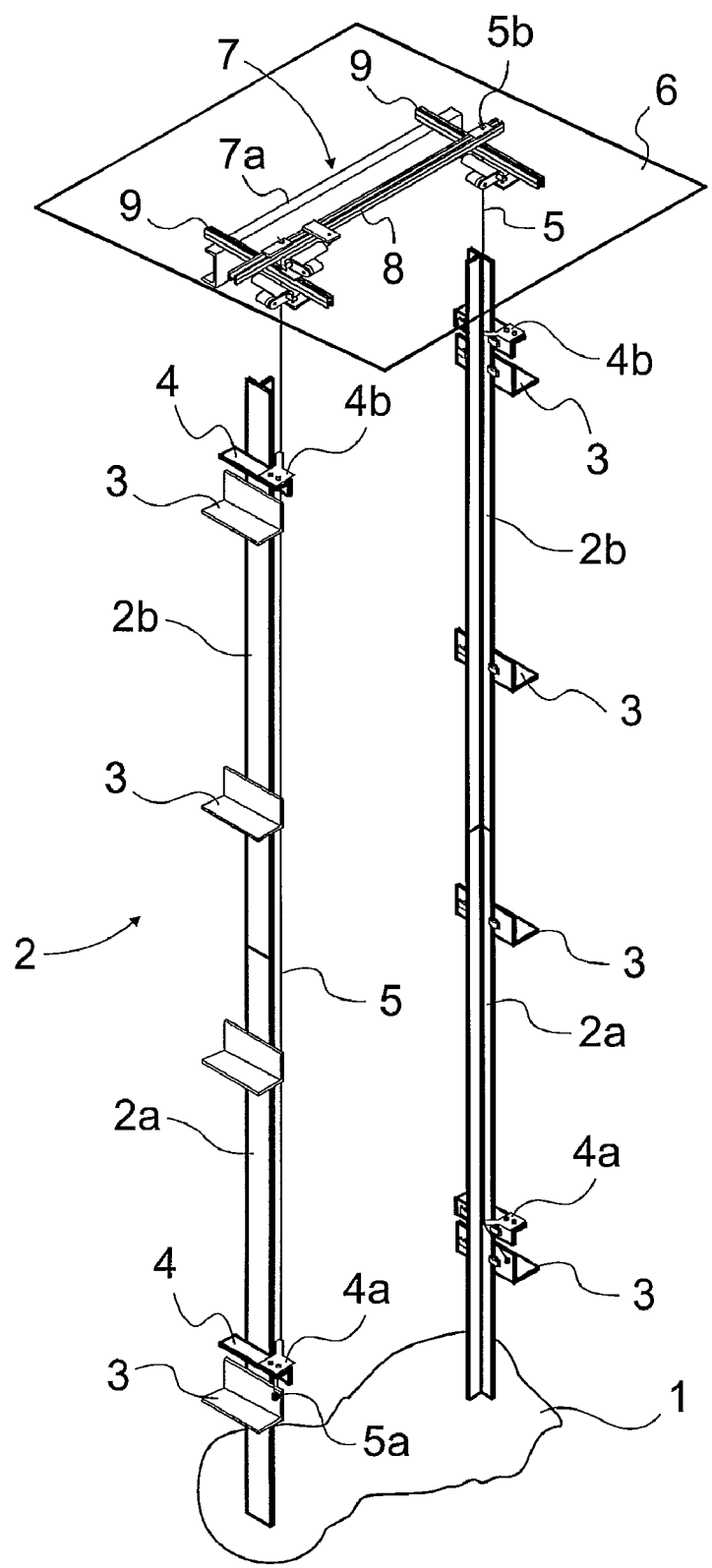

ARRANGEMENT AND METHOD FOR POSITIONING THE ALIGNMENT PLUMB LINES OF THE GUIDE RAILS OF AN ELEVATOR

Cross Reference to Related Applications

This application is a Continuation of PCT International Application No. PCT/F12009/000058 filed on Jun. 16, 2009, which claims the benefit of Patent Application No. 20080419 filed in Finland, on Jun. 27, 2008. The entire contents of all of the above applications is hereby incorporated by reference.

The object of the invention is an arrangement as defined in the preamble of claim 1 and a method as defined in the preamble of claim 7 for positioning the alignment plumb lines of the guide rails of an elevator, more particularly when installing an elevator during the construction phase of a building.

In the construction stage of high-rise buildings there is often a need to use an elevator even before the final completion of the building. Elevators are needed for many different usage purposes in the construction stage. For example, in construction-time use they are needed for the transportation of construction workers, so it would be desirable for the construction workers to be able to move safely and quickly as high up in the building as possible as new floors are completed. Therefore, the elevators should be able to reach floors in the building that are as high as possible as construction of the building advances, and the higher the floors that the elevator is able to safely serve, the better. Moreover, in high-rise buildings the lower floors are generally completed and ready for normal use before the higher floors are finished. Therefore, the elevators are required to be able to serve the already completed floors in as normal a manner as possible, even if the higher floors of the building are still under construction.

During the construction time, construction workers and building materials can be transported by means of separately installed construction elevators mounted e.g. on the facade of the building, which are dismantled after the building has been completed. Such solutions involve the problems of installation and the high cost of the extra elevators and the expenses resulting from the dismantling. A further problem is that these types of construction elevators cannot provide normal elevator service to the completed lower floors of the building.

In prior art, to address this problem, a so-called jump elevator has been developed for construction-time use. In such a solution, the final elevator hoistways are built to their completed form in connection with the erection of the building and at least some of the elevator hoistways are provided with a temporary machine room with an elevator car attached to it. At certain stages of construction, when a suitable number of new floors have been completed, e.g. two new floors, a so-called jump-lift is performed, whereby the temporary elevator machine room is moved higher up by the distance allowed by the number of new floors. Thus, the hoisting height of the elevator is increased by this number of floors. At the same time, all the required elevator components are extended to a level corresponding to the new height to enable the elevator to serve the new floor height in the normal manner.

One problem in the aforementioned construction-time installation of an elevator is the re-positioning of the plumbing lines, i.e. the alignment plumb lines, always after each new jump-lift. According to prior art, the alignment plumb lines must be detached during the jump-lift, and fixed and re-positioned always after a jump-lift. For this two people are needed in prior-art solutions and also they must spend a lot of time on this work. As a consequence, the work of installing the alignment plumb lines slows down the completion of the elevator and as a labor-intensive job is also expensive.

The object of the present invention is to eliminate the aforementioned drawbacks and to produce a reliable and safe arrangement and method wherein the positioning of the alignment plumb lines for the guide rails of an elevator can be performed efficiently and quickly by only one person. The object of the invention is also to reduce the installation costs of the construction-time elevator of a building and to speed up installation of the elevator. The arrangement according to the invention is characterized by what is disclosed in the characterization part of claim 1 and the method according to the invention is characterized by what is disclosed in the characterization part of claim 7. Correspondingly, other embodiments of the invention are characterized by what is disclosed in the other claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts. Likewise the different details presented in connection with each embodiment can also be applied in other embodiments.

One advantage of the solution of the invention is the simple, inexpensive and fast, as well as punctual and precise, re-positioning of the alignment plumb lines as well as of the alignment apparatus during installation of the elevator after a jump-lift has been performed. Another advantage is that one only person is sufficient for re-positioning instead of the two people needed before. This solution also saves the time of the construction workers and thus accelerates the completion of the building.

The arrangement according to the invention for positioning the alignment plumb lines of the guide rails of an elevator, more particularly when installing an elevator during the construction phase of the building, comprises at least actuators fixed above the guide rails for moving at least the parts of the alignment plumb lines above the guide rails in order to position the alignment plumb lines.

In one embodiment of the invention first actuators are arranged to position the alignment plumb lines in essentially an orthogonal direction to the guide rail plane and at least one second actuator is arranged to position the alignment plumb lines in essentially the direction of the guide rail plane.

In one embodiment of the invention the arrangement comprises at least an alignment apparatus supported above the guide rails, into which actuators are disposed to move the top ends of the alignment plumb lines.

In one embodiment of the invention the arrangement comprises means for controlling the actuators by remote control by means of a control panel, which control panel is connected wirelessly to the actuators.

In one embodiment of the invention the arrangement comprises means for controlling the actuators by remote control by means of the control panel, which control panel is connected by wireline via a control conductor to the actuators.

In one embodiment of the invention the alignment apparatus comprises support means in essentially the direction of the guide rail plane, which support means comprises support points at a distance, preferably the essentially horizontal distance between the guide rails, from each other, to which support points the top ends of the alignment plumb lines are fixed or via which the alignment plumb lines are supported in position, and the actuators are arranged to move the support means in both the direction of the guide rail plane and in an orthogonal direction to the guide rail plane in connection with positioning the alignment plumb lines.

In one embodiment of the invention the arrangement comprises two first actuators, each of which is supported, e.g. by fixing directly or indirectly, by a support structure and is fixed to a support means such that their fixing points to the support means (8) are at a horizontal distance from each other, and preferably such that they can move the support means by taking the supporting force needed for moving from the support structure directly or indirectly, and which two first actuators are both arranged to move the support means in the same direction, preferably in an orthogonal direction to the guide rail plane. One advantage is that the position of a sizeable/long support means can be well controlled in the orthogonal direction to its longitudinal direction and e.g. its jamming in the guide rails can be avoided. Thus also the position of both the ends of the support means can be adjusted separately. In addition to this, it is preferred to move the support means in the direction (8*b*) of the guide rail plane.

In the method according to the invention for positioning the alignment plumb lines of an elevator, more particularly when installing an elevator in the construction phase of a building, at least one, preferably two, alignment plumb lines are supported from the building or corresponding via at least one support point and are positioned into the desired location by moving the support point/support points of the alignment plumb line. The alignment plumb line/alignment plumb lines are positioned by moving the support points of the alignment plumb lines by means of separate actuators.

In one embodiment of the invention the guide rails of the elevator are positioned on the basis of the alignment plumb lines.

In one embodiment of the invention the alignment plumb lines are positioned by moving two alignment plumb lines simultaneously, both of which alignment plumb lines are supported by the same support means at a distance, preferably at some predetermined distance, from each other, and the distance of which alignment plumb lines from each other is kept constant during movement of the support points. The aforementioned supporting at a distance from each other is performed preferably before the upward transfer of the alignment apparatus in the elevator hoistway, and already when the alignment apparatus is in its previous position, when being in which previous position the alignment apparatus has been used to position the guide rails of the elevator. That being the case, the guide rails are positioned with an alignment apparatus before and after a transfer of the alignment apparatus, with the same distance between the plumb lines, i.e. without changing the aforementioned distance in connection with the transfer.

In one embodiment of the invention the guide rails of the elevator are positioned with an alignment apparatus before and after a transfer of the alignment apparatus, with the same distance between the plumb lines. Thus, e.g. after a jump-lift, it is quick to perform the positioning by moving the lines that are fixed to the same support means and that are at the correct distance from each other to the correct points.

In one embodiment of the invention the alignment plumb lines are positioned by moving those support points of the alignment plumb lines that are above the guide rails by means of separate actuators.

In one embodiment of the invention the top ends of the alignment plumb lines are fixed to support points in the support means of essentially the direction of the guide rail plane, and the support means is moved with an actuator in connection with positioning the alignment plumb lines in two directions, preferably both in the direction of the guide rail plane and in an orthogonal direction to the guide rail plane.

In one embodiment of the invention the actuator is driven under remote control by means of a control panel, either wirelessly or by wireline. One advantage, among others, is that one employee can position the lines by remotely controlling them and at the same time himself/herself checking the positioning while being at the alignment elements. One advantage, among others, of wireless control is that the wirings are not in the way and do not disturb the alignment by hitting the alignment plumb lines.

In one embodiment of the invention the correct place of each alignment plumb line is determined according to at least one, preferably two, already installed alignment elements fixed to the structures of the elevator, the alignment point contained in which the plumb line is moved to pass through by moving the aforementioned at least one support point. The advantage, among others, of one support point is that it is easy to use in an application in which an end of the alignment plumb line comprises a weight to straighten the line. One advantage, among others, in using two alignment points per one plumb line is that it does not require a separate weight at the bottom end. The method is advantageous in, among other things, the positioning of the parts of diagonal elevators, in which the line is not placed to pass in a vertical position.

In the method in one embodiment of the invention the alignment plumb lines are positioned by moving the support means (8) with two actuators, of which the fixing points to the support means are at a horizontal distance from each other such that the aforementioned two first actuators (10) both move the support means in the same direction, preferably in an orthogonal direction to the guide rail plane.

In the method in one embodiment of the invention the additional line needed in connection with the upward transfer, e.g. with a jump-lift, of the alignment apparatus supported upon a support structure supported by the building is taken from a stationary reel, e.g. supported by a guide rail or a guide rail fixing, in the elevator hoistway below the alignment apparatus. Preferably the additional wire required by at least two consecutive moves is taken from the reel. The reel is preferably arranged to resist, e.g. by means of a brake function, the unreeling of the line from the reel in order to produce sufficient line tautness in the line to enable it to be taut and therefore to stay essentially straight. Taking additional line from the reel in connection with a transfer of the support structure and/or the alignment apparatus can form a separate invention independently of other features/procedures of the arrangement/method presented in this application.

Figure 2:
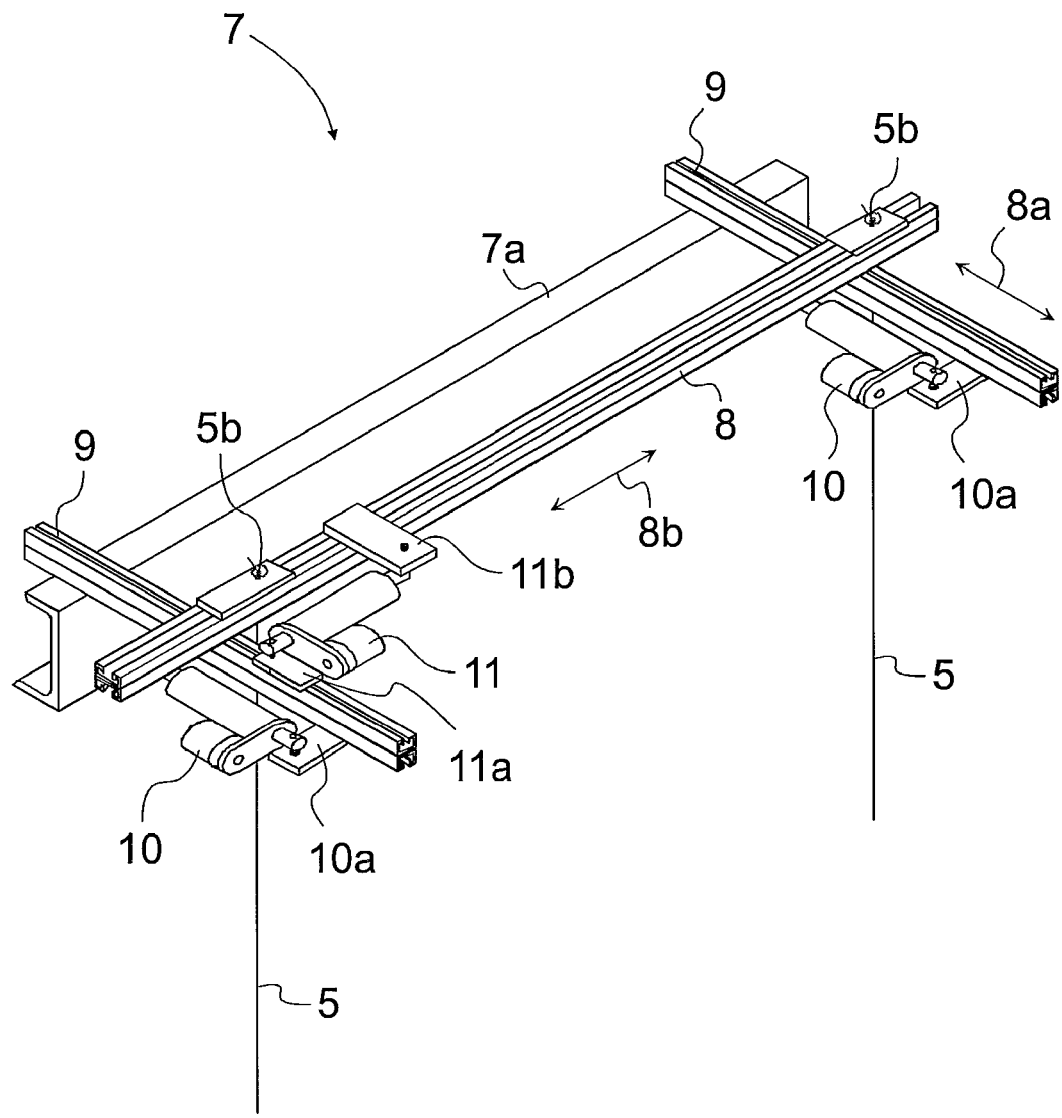
Figures 3, 4:
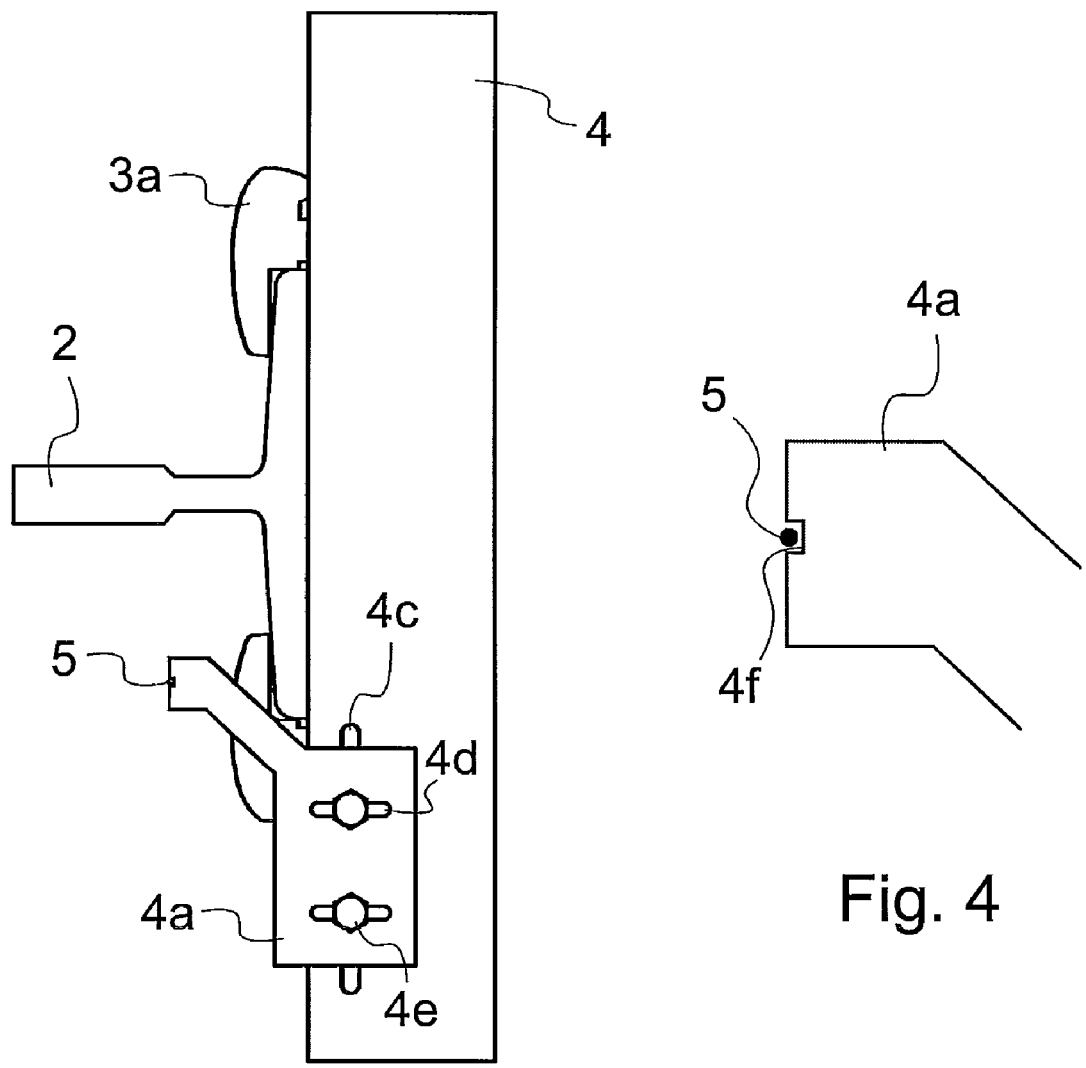
Figure 5:
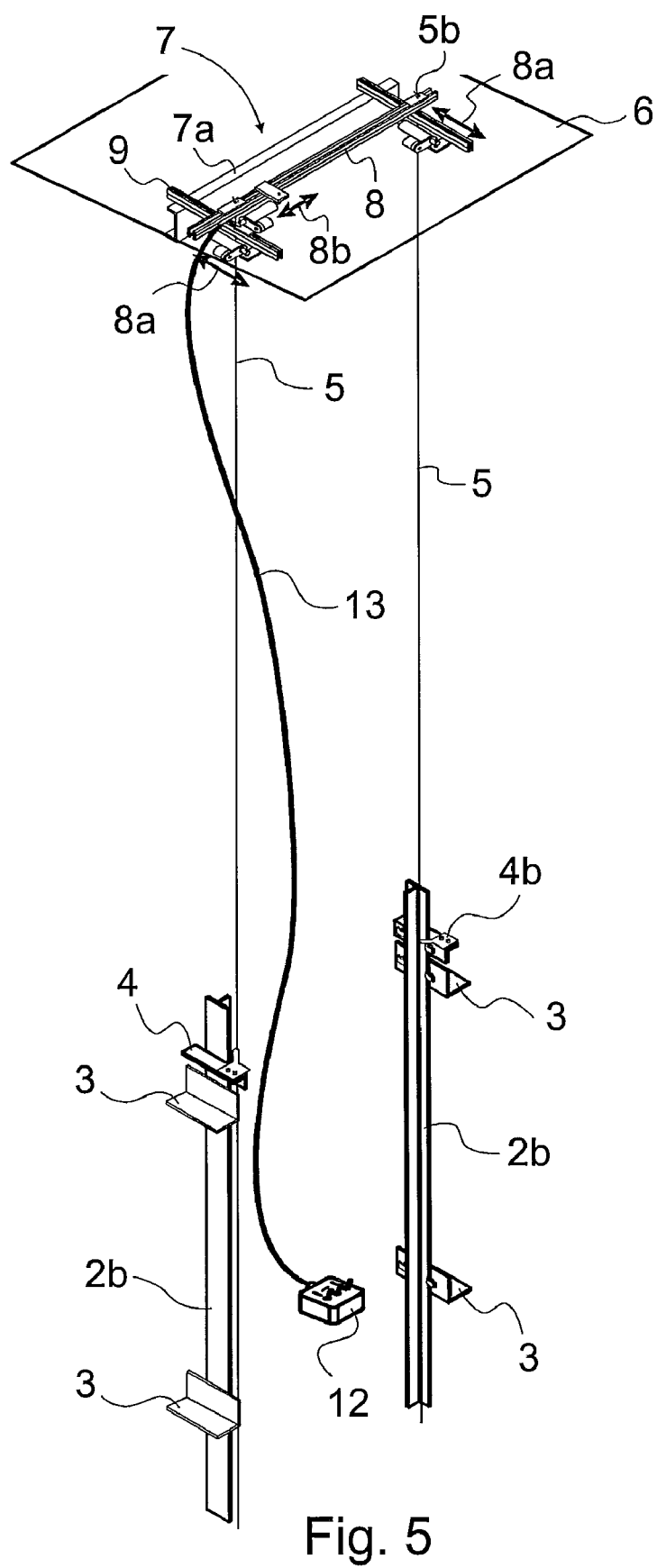
Figure 6:
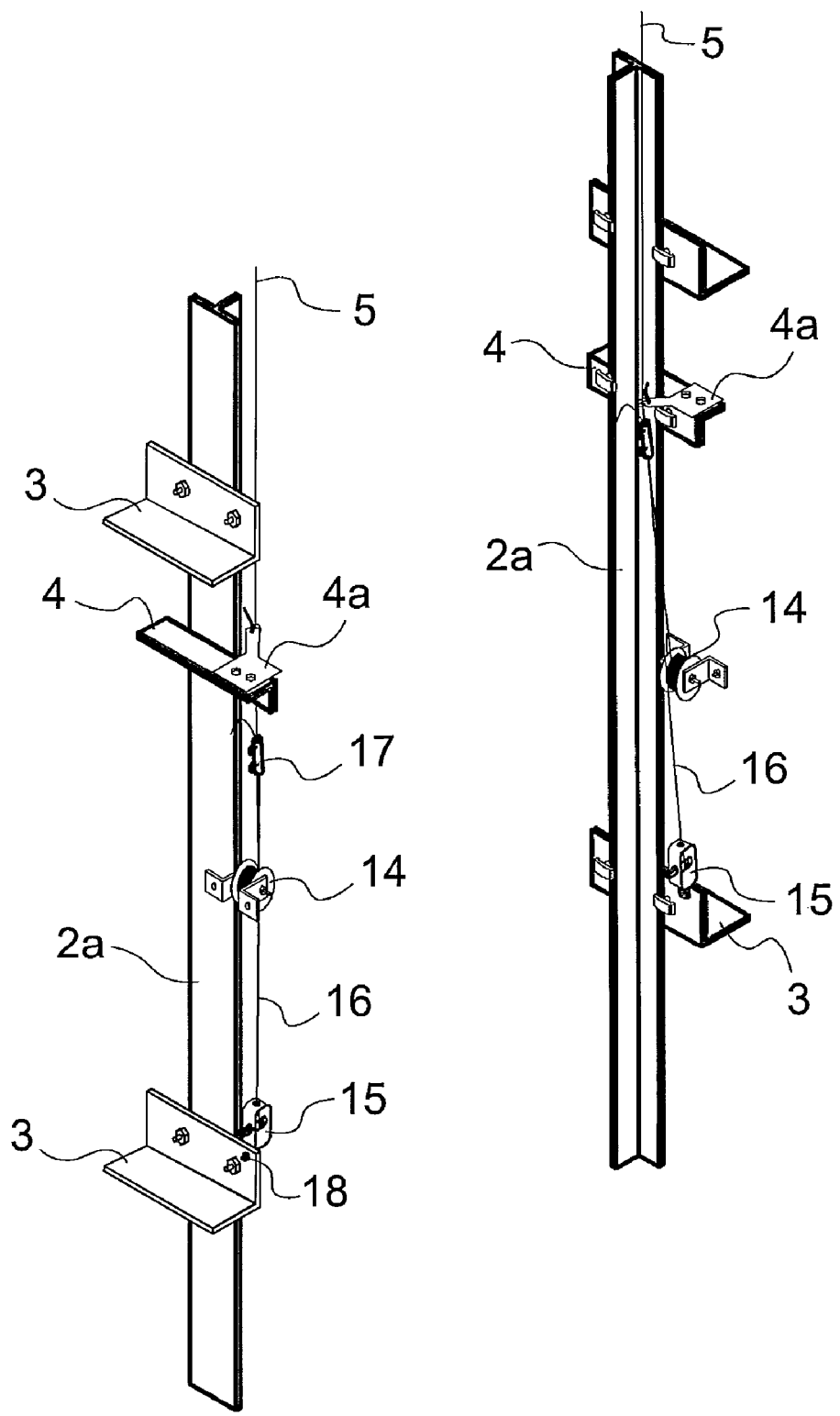

In the following, the invention will be described in greater detail by referring to an embodiment example and the attached drawings, wherein FIG. 1 presents a simplified and diagrammatic oblique top view of an installation situation according to the invention, in which the two lowermost guide rail layers have already been installed in the elevator hoistway, FIG. 2 presents a simplified and diagrammatic oblique top and magnified view of an alignment apparatus used in the invention, FIG. 3 presents a simplified and diagrammatic top view of an installation situation according to the invention, in which the lowermost guide rail has been fixed to its base, FIG. 4 presents a simplified, diagrammatic and magnified view of an alignment element of an alignment plumb line, FIG. 5 presents a simplified and diagrammatic oblique top view of an installation situation according to the invention wherein a first jump-lift has been carried out, and FIG. 6 presents a simplified and diagrammatic oblique top view of a preferred embodiment of the invention.

FIGS. 1 and 2 present a simplified and diagrammatic oblique top view of one arrangement according to the invention in a situation in which, among other things, at least the lowermost guide rails 2a and the next-to-lowermost guide rails 2b of the guide rail assembly 2 are fixed by means their fixing bases 3 to the walls of the elevator hoistway 1, of which elevator hoistway 1 only a part of the bottom of the hoistway is presented in FIG. 1.

As the start of the installation, the guide rails 2a and 2b of the guide rail assembly 2 are installed precisely into position in the elevator hoistway 1 with some prior-art method such that the first guide rails 2a and the second guide rails 2b are one above the other and exactly in the correct, preferably vertical, line. The lower alignment elements 4a of the alignment plumb lines 5, said elements being fixed to their bases 4, are placed on the lowermost guide rail pair 2a at a suitable height, e.g. close to the lowermost fixing bases 3 of the guide rails. The lowermost alignment elements 4a are positioned in relation to the guide rails with an installation tool (not presented) suited to the purpose such that they can be fitted into a certain position and at a precise predetermined distance from the guide rail. After this the upper alignment elements 4b are installed with the same tool and with the same method as the alignment elements 4a, but at a different height, e.g. close to the top ends of the second guide rails 2b. The alignment plumb lines 5 are fixed at their bottom ends to their first fixing point 5a, e.g. to the fixing base 3 of the guide rails below the alignment elements 4a, and are supported in position on the lowermost alignment elements 4a. In this case there are two alignment points one above the other for one alignment plumb line 5. Since the alignment elements 4a and 4b are both positioned into the same exact position in relation to the already positioned guide rails 2a and 2b, the straight plumb line between the alignment grooves of said alignment elements is automatically parallel with the guide rails 2a and 2b. As a consequence of this the alignment plumb line can be aligned to be parallel with the already installed guide rail by moving the alignment plumb line held straight such that it passes via both alignment grooves. This occurs by moving the support point of the alignment line in the top part of the elevator hoistway so that the line settles into the grooves. Since in the embodiment of FIG. 5 the line is fixed at the fixing point 5a and bends upwards via the groove of the already installed lower alignment element 4a, it is sufficient that the top end of the alignment line is guided into the groove of the upper alignment element. In this case it is obvious that the alignment line may not lean on the groove of the upper alignment apparatus such that it could bend or that it could continue straight past the upper alignment apparatus. When proceeding thus the section of alignment line between the upper alignment element and the support point is also automatically parallel with the already installed guide rails. It is advantageous to perform the positioning of the alignment line by moving the support point as described always when the positioning of the alignment lines has been transferred, e.g. in connection with a jump-lift or a moving of the installation platforms. This is preferably performed e.g. with the alignment apparatus presented in FIG. 2. More is explained about how positioning is performed after a jump-lift in connection with the description relating to FIG. 5. After positioning of the alignment plumb lines the alignment plumb lines can be used in installing the parts of the elevator, e.g. in the positioning of the next guide rail sections. For example, the guide rail positioning tool presented in the publication WO00/47510 can be used for this. In addition, it is advantageous to add the aforementioned positioning function of the alignment elements in connection with the installation tool in question.

A support structure 6, such as a waterproof platform or other suitable installation platform, is above the installed guide rails 2a and 2b, to which support structure the alignment apparatus 7 of the alignment plumb lines 5 is fixed. In FIG. 2 the magnified and more visible alignment apparatus 7 comprises at least a frame beam 7a of the direction of the guide rail plane of the guide rails 2 and two beam-like guide means 9 parallel to each other and transverse to the frame beam 7a, which guide means are fixed at their first ends to the frame beam 7a at a horizontal distance from each other, which horizontal distance is essentially at least as great as the horizontal distance between the guide rails. Guide rail plane refers in this context to a plane formed by guide rails 2 that are opposite and facing each other, which plane runs via the essentially center line of the guide rails 2. A beam-like support means 8 essentially of the direction of the guide rail plane, that moves in the longitudinal and lateral direction of the guide means 9, is fitted on top of the guide means 9, which support means comprises support points 5b at essentially the horizontal distance between the guide rails 2 apart from each other, to which support points the top ends of the alignment plumb lines 5 are fixed or via which the alignment plumb lines 5 are supported in position, if the top ends are fixed to a higher point.

In addition the alignment apparatus 7 comprises at least first actuators 10, such as actuators for moving the alignment plumb lines 5 in the transverse direction with respect to the guide rail plane, in which case the first actuators 10 for moving the alignment plumb lines 5 move the support means 8 in the direction of the guide means 9 either away from the frame beam 7a or in the direction of the frame beam 7a. The actuators 10 are fixed at their first end to a support means 8 of the direction of the guide rail plane and securely at their other ends by the aid of a fixing means 10a to the second end, i.e. the free end, of the guide means 9. When the actuators 10 increase their length the support means 8 and the alignment plumb lines 5 move towards the frame beam 7a and correspondingly when the actuators shorten their length the support means 8 and the alignment plumb lines 5 move away from the frame beam 7a. The movements of the alignment plumb lines 5 occur in this case in the direction of the arrow 8a. Both the first actuators 10 of the alignment apparatus 7 are arranged to operate either jointly or separately, independently of each other.

In addition to this the alignment apparatus 7 comprises at least a second actuator 11, such as an actuator for moving the alignment plumb lines 5 in the direction of the guide rail plane. The actuator 11 is fixed securely at its first end by the aid of a fixing means 11a to a first guide means 9, which is transverse with respect to the guide rail plane, and at its second end by the aid of a fixing means 11b securely to the support means 8 of the direction of the guide rail plane. When the second actuator 11 increases or shortens its length it moves the support means 8 of the guide rail plane direction in the direction of the guide rail plane such that both the alignment plumb lines 5 move simultaneously and retain the distance between each other. The support means 8 of the direction of the guide rail plane moves in this case transversely in relation to the guide means 9 in the direction of the arrow 8b.

FIGS. 3 and 4 present the lower alignment element 4a of an alignment plumb line 5 in more detail. The upper alignment element 4b is essentially similar. The alignment element 4a is fixed e.g. to the lowermost guide rails 2a at a suitable height by means of the fixing base 4, to which fixing base the alignment element is fixed e.g. with a screw fixing 4e. The fixing base 4 comprises an elongated fixing groove 4c in the direction of the fixing base and correspondingly the frame of the alignment element 4a comprises essentially transverse elongated fixing grooves 4d with respect to the fixing groove 4c, by means of which fixing grooves 4c and 4d the alignment element 4a can be placed in exactly the desired point on its base 4. The alignment element 4a comprises an alignment groove 4f in the proximity of the guide rail 2, into which alignment groove the alignment plumb line 5 is fitted in connection with positioning the alignment plumb lines.

FIG. 5 illustrates an installation situation wherein a first jump-lift has been performed and the alignment apparatus 7 of the alignment plumb lines 5 has been lifted to the next height. Since the alignment apparatus 7 is not necessarily in the correct point in the vertical direction after the lift, it must be re-positioned so that the alignment plumb lines 5 are placed into the correct vertical line. Positioning of the alignment apparatus 7 and at the same time of the alignment plumb lines 5 is performed under remote control by means of the control panel 12 that the arrangement comprises, which functions as a remote controller, as well as by means of the actuators 10 and 11. The control panel 12 is connected to the actuators 10 and 11 either wirelessly or by wireline via a control conductor 13. The alignment plumb lines 5 are moved in the alignment apparatus 7 using the control panel 12 by means of two different actuators 10 in essentially a transverse direction 8a to the guide rail plane and by means of one actuator 11 in essentially the direction 8a of the guide rail plane simultaneously with the other actuators by moving the support means 8 of the guide rail plane. The positioning of the alignment plumb lines 5 can thus be performed by one person, because he/she is able to control the alignment plumb lines 5 from below, at roughly the height of the upper alignment elements 4b and therefore sees when the alignment plumb lines 5 are at the right point in the alignment grooves 4f of the alignment elements 4b. In the aforementioned solution the alignment plumb lines 5 are positioned by moving the support points 5b of the alignment plumb lines 5 above the guide rails 2—or more precisely stated the parts above the upper alignment elements 4b, i.e. the top ends of the alignment plumb lines 5 at the same time, if they are fixed to the support points 5b.

FIG. 6 presents a preferred embodiment of the invention, in which the alignment plumb lines 5 are not securely fixed below the lower alignment elements 4a, but instead to reels 14 below them that are provided with a brake function, from where the more alignment plumb line 5 is always automatically received in connection with a jump-lift, but the brake function of which reel 14 prevents the alignment plumb line from uncoiling from the reel 14 too easily. In addition, the structure comprises e.g. a spring-action tensioner 15 of both the alignment plumb lines 5 as well as a locking piece 17, which is connected to the tensioner 15 of the alignment plumb line 5 by means of a tensioning line 16. A tensioner 15 is fixed to its fixing point 18, e.g. to one fixing base 3 of the guide rail 2a.

When using a reel 14, the lowermost guide rails 2a are installed and aligned in the normal way. After this the alignment points of the alignment plumb lines 5 are created by fixing the lower alignment element 4a to both guide rails essentially below the upper fixing base 3 of the guide rail and by fixing the alignment plumb line reels 14 e.g. to the guide rails 2a below the lower alignment elements 4a. From the reel 14 both the alignment plumb lines 5 are led upwards via the groove 4f of the lower alignment element 4a to the alignment apparatus 7 fixed to the support structure 6. Additionally, a tensioner 15 is fixed to the lowermost guide rail 2a below each reel 14, from which tensioner a tensioning line 16 is led to the locking piece 17, which locking piece 17 is locked to the alignment plumb line 5 above the reel 14. The purpose of the tensioner 15 is to keep the alignment plumb line 5 sufficiently taut. The upper alignment point of the alignment plumb lines 5 is created above the aforementioned upper fixing base 3 of the guide rail by fixing the upper alignment element 4b by means of its fixing base 4 to a suitable point on the guide rail.

Before the support structure 6 and the alignment apparatus 7 fixed to it are raised in connection with the next jump-lift, the alignment plumb lines 5 are loosened by opening the locking pieces 17, in which case new alignment plumb line 5 is available from the reels 14 during the jump-lift. Correspondingly, the alignment plumb lines 5 are still supported before the jump-lift on the frame of the upper alignment element 4b, so as to be able to prevent slackening of the alignment plumb lines 5 below the temporary machine room and snagging of the alignment plumb lines 5 on the elevator car. For the sake of clarity the temporary machine room and the elevator car are not presented in the figures. Any slack section in the alignment plumb lines 5 produced in connection with a jump-lift is tightened by pulling the alignment plumb lines 5 downwards and by coiling the line section passing downwards onto the reels 14 as well as finally by tightening the locking pieces 17 around the taut alignment plumb lines 5. After tensioning the re-positioning of the alignment plumb lines 5 is performed in the manner described above.

The additional arrangement of an alignment plumb line in connection with a jump-lift presented in FIG. 6 can form a separate invention of a positioning arrangement of an alignment plumb line.

It is obvious to the person skilled in the art that different embodiments of the invention are not limited to the example described above, but that they may be varied within the scope of the claims presented below. Thus, for example, the structure and operation of the alignment apparatus can be different to what is presented above. What is essential is that the arrangement comprises actuators, with which the alignment plumb lines can be moved in different directions, e.g. in the direction of the guide rail plane and in a transverse direction with respect to the guide rail plane.

It is also obvious to the person skilled in the art that the placement positions of the alignment elements of the alignment plumb lines can be different to what is presented above and that they can be moved upwards as the installation progresses.

It is further obvious to the person skilled in the art that the bottom end of an alignment plumb line can be freely hanging and provided with a weight instead of the bottom end being fixed to a fixing base.

It is also obvious to the person skilled in the art that moving the support points in the top part of the alignment plumb lines, i.e. in practice the top parts of the alignment plumb lines, by remote control wirelessly requires means for operating a wireless remote control. In this case the control panel comprises e.g. a transmitter and the actuator comprises receivers for delivering remote-control signals from the control panel to the actuators that move the alignment plumb lines.

It is also obvious to the person skilled in the art that the support points in the top part of the alignment plumb lines can be moved in other directions than only in the direction of the guide rail plane and in an orthogonal direction to this. The support points can, among other things, be moved in any such x and y direction whatsoever, which directions are at a right angle both with respect to each other and with respect to the length direction z of the elevator hoistway. The objective is to get each alignment line moved to any desired point whatsoever as viewed in the longitudinal direction of the elevator hoistway.

It is also obvious that the invention is applicable for use in the positioning of other elevator components than guide rails. The invention is at its most advantageous in connection with jump-lifts, but it is obvious that the invention is applicable for use also in connection with installing elevators in completed buildings. The invention is applicable for use, among other things, always when a plumbing jig is moved for one reason or another.

The invention claimed is:

1. Arrangement for positioning the alignment plumb lines of the guide rails of an elevator, more particularly when installing the elevator during the construction phase of the building, wherein the arrangement comprises at least actuators fixed above the guide rails for moving at least the parts of the alignment plumb lines above the guide rails for positioning the alignment plumb lines.

2. Arrangement according to claim 1, wherein first actuators are arranged to position the alignment plumb lines in essentially an orthogonal direction to the guide rail plane and at least one second actuator is arranged to position the alignment plumb lines in essentially the direction of the guide rail plane.

3. Arrangement according to claim 1, wherein the arrangement comprises at least an alignment apparatus supported above the guide rails, in which alignment apparatus actuators are disposed to move the top ends of the alignment plumb lines.

4. Arrangement according to claim 1, wherein the arrangement comprises means for controlling the actuators by remote control by means of a control panel, which control panel is connected to the actuators wirelessly.

5. Arrangement according to claim 1, wherein the arrangement comprises means for controlling the actuators by remote control by means of a control panel, which control panel is connected to the actuators by wireline via a control conductor.

6. Arrangement according to claim 1 wherein the alignment apparatus comprises support means of essentially the direction of the guide rail plane, which support means comprises support points at a distance from each other, preferably the essentially horizontal distance between the guide rails, to which support points the top ends of the alignment plumb lines are fixed or via which the alignment plumb lines are supported in position, and in that actuators are arranged to move the support means in both the direction of the guide rail plane and in an orthogonal direction to the guide rail plane in connection with positioning the alignment plumb lines.

7. Arrangement according to claim 1 wherein the arrangement comprises two first actuators, each of which is supported, e.g. by fixing directly or indirectly, by a support structure and fixed to a support means such that they can move the support means by taking supporting force from the support structure directly or indirectly, and in that their fixing points to the support means are at a horizontal distance from each other, and which two first actuators are both arranged to move the support means in the same direction, preferably in an orthogonal direction to the guide rail plane.

8. Method for positioning the alignment plumb lines of an elevator, more particularly when installing an elevator in the construction phase of a building, in which method at least one alignment plumb line is supported from the building or corresponding via at least one support point and are positioned into the desired location by moving the support point of the alignment plumb line, wherein the alignment plumb line is positioned by moving the support point of the alignment plumb line by means of an actuator.

9. Method according to claim 8, wherein the alignment plumb lines are positioned by moving the support points of the alignment plumb lines above the guide rails by means of separate actuators.

10. Method according to claim 8, wherein the top ends of the alignment plumb lines are fixed to the support points in the support means of essentially the direction of the guide rail plane, and in that the support means is moved with the actuator in both the direction of the guide rail plane an in an orthogonal direction to the guide rail plane in connection with positioning the alignment plumb lines.

11. Method according to claim 8, wherein the actuator is driven under remote control by means of the control panel, either wirelessly or by wireline.

12. Method according to claim 8, wherein the method the alignment plumb lines are positioned by moving the support means with two actuators, the fixing points of which actuators to the support means are at a horizontal distance from each other such that the aforementioned two first actuators both move the support means in the same direction, preferably in an orthogonal direction to the guide rail plane.

13. Method according to claim 8, wherein the method the additional line needed in connection with a transfer, e.g. a jump-lift, of the alignment apparatus supported upon a support structure supported by the building is taken from a stationary reel, e.g. one supported by a guide rail or by a guide rail fixing, in the elevator hoistway below the alignment apparatus.

14. Method according to claim 8, wherein the alignment plumb lines are positioned by moving two alignment plumb lines simultaneously, both of which alignment plumb lines are supported by the same support means at a distance, preferably at some predetermined distance, from each other, and the distance of which alignment plumb lines from each other is kept constant during movement of the support points.

15. Method according to claim 8, wherein the guide rails of the elevator are positioned with an alignment apparatus before and after a transfer of the alignment apparatus, with the same distance between the plumb lines.

16. Arrangement according to claim 2, wherein the arrangement comprises at least an alignment apparatus supported above the guide rails, in which alignment apparatus actuators are disposed to move the top ends of the alignment plumb lines.

17. Arrangement according to claim 2, wherein the arrangement comprises means for controlling the actuators by remote control by means of a control panel, which control panel is connected to the actuators wirelessly.

18. Arrangement according to claim 3, wherein the arrangement comprises means for controlling the actuators by remote control by means of a control panel, which control panel is connected to the actuators wirelessly.

19. Arrangement according to claim 2, wherein the arrangement comprises means for controlling the actuators by remote control by means of a control panel, which control panel is connected to the actuators by wireline via a control conductor.

20. Arrangement according to claim 3, wherein the arrangement comprises means for controlling the actuators by remote control by means of a control panel, which control panel is connected to the actuators by wireline via a control conductor.

* * * * *